US006467754B2

(12) United States Patent
Bircann et al.

(10) Patent No.: US 6,467,754 B2
(45) Date of Patent: Oct. 22, 2002

(54) ADAPTABLE GAS AND MOISTURE SHIELD FOR A GAS MANAGEMENT VALVE

(75) Inventors: Raul A. Bircann, Penfield; Dwight O. Palmer; Paul L. Gluchowski, both of Rochester, all of NY (US)

(73) Assignee: Delphi Technologies, Inc., Troy, MI (US)

( * ) Notice: Subject to any disclaimer, the term of this patent is extended or adjusted under 35 U.S.C. 154(b) by 32 days.

(21) Appl. No.: 09/788,740

(22) Filed: Feb. 20, 2001

(65) Prior Publication Data

US 2001/0032953 A1 Oct. 25, 2001

Related U.S. Application Data

(60) Provisional application No. 60/184,760, filed on Feb. 24, 2000.

(51) Int. Cl.[7] .......................... F16K 31/44; F16K 31/02

(52) U.S. Cl. ................................... 251/214; 251/129.15

(58) Field of Search ............................ 251/214, 129.15

(56) References Cited

U.S. PATENT DOCUMENTS 3,319,647 A * 5/1967 Morain ....................... 137/312
3,703,184 A * 11/1972 Messerschmidt ............ 137/509
3,779,271 A * 12/1973 Legrandgerard ....... 137/315.28
4,325,558 A * 4/1982 Poggio ..................... 123/188.6
4,589,628 A * 5/1986 Barker et al. ............... 251/214
4,725,040 A * 2/1988 Fornuto et al. ............. 137/883
4,805,582 A * 2/1989 Braun et al. ........... 123/568.26
4,998,707 A * 3/1991 Meyer et al. ............... 137/340
5,188,073 A * 2/1993 Ejiri et al. ............. 123/339.28
5,626,165 A 5/1997 Shinobu
5,701,874 A 12/1997 Sari et al.
6,062,536 A * 5/2000 Bircann ................. 251/129.15
6,128,646 A * 10/2000 Miloslavsky ................ 137/340
6,217,001 B1 * 4/2001 Gluchowski et al. .. 251/129.15
6,295,975 B1 * 10/2001 Yew et al. ............... 123/568.2
6,367,675 B1 * 4/2002 Woerner .................... 226/97.4

FOREIGN PATENT DOCUMENTS

DE 19539921 10/1995
EP 0829638 3/1998

OTHER PUBLICATIONS

European Search Report –01200648.2 –2311 Jul. 15, 2002.

* cited by examiner

*Primary Examiner*—Lesley D. Morris
*Assistant Examiner*—David A Bonderer
(74) *Attorney, Agent, or Firm*—Patrick M. Griffin

(57) ABSTRACT

A shield for a gas management pintle valve, such as an exhaust gas recirculation valve for an internal combustion engine, for mitigating leakage of gas and moisture along the valve pintle into the actuator, to prevent corrosion and failure of the actuator. The shield is a tubular member having an equatorial radial flange and is slidably mounted on the pintle in an annular chamber between the valve body and the actuator. The inner diameter of the tube is selected to be as close-fitting to the pintle as possible while still being slidable thereupon to be adapted to either of two operating positions. During engine shutdowns, the shield is drawn by gravity toward the valve body to form a first seal with the flange against the pintle bearing or a bearing splash shield, preventing or minimizing the escape of moist, hot gases under low pressure from the valve along the pintle. During engine running, high-pressure exhaust gases within the valve may be forced along the pintle through the bearing bore and bearing splash shield toward the actuator. The gases force the shield to slide along the pintle, opening the first seal and forming a second seal with the flange against the actuator, allowing the leaked gases to escape radially from the pintle without invading the actuator.

5 Claims, 4 Drawing Sheets

ADAPTABLE GAS AND MOISTURE SHIELD FOR A GAS MANAGEMENT VALVE

CROSS REFERENCE TO RELATED APPLICATIONS

This application claims the benefit of U.S. Provisional Application, Serial No. 60/184,760, filed Feb. 24, 2000.

TECHNICAL FIELD

The present invention relates to pintle-type valves; more particularly to pintle valves for permitting the controlled admission of exhaust gases into the fuel intake manifold of an internal combustion engine; and most particularly to a slidable pintle shield for preventing entrance of corrosive gases and moisture into the valve actuator.

BACKGROUND OF THE INVENTION

It is well known in the automotive art to provide a variable valve connecting the exhaust manifold with the intake manifold of an internal combustion engine to permit selective and controlled recirculation of a portion of an engine's exhaust gas into the fuel intake stream. Such recirculation is beneficial for reducing the burn temperature of the fuel mix in the engine to reduce formation of nitrogen and sulfur oxides which are significant components of smog. Such a valve is known in the art as an exhaust gas recirculation (EGR) valve.

Typically, an EGR valve has a valve body enclosing a chamber disposed between a first port in the exhaust manifold and a second port in the intake manifold; a valve seat dividing the chamber between the two ports; a valve pintle having a valve head fitted to the valve seat and a valve stem extending from the valve head through a bearing mounted in a third port in a sidewall of the valve body; a spring-retained bearing splash shield; and a solenoid actuator mounted on the exterior of the valve body and operationally connected to the outer end of the valve pintle.

A problem inherent to EGR valve applications is that the managed fluid (exhaust gas) is moisture-laden, corrosive, and dirty. If this gas is allowed to enter the actuator by leaking along the valve pintle, then internal corrosion, malfunction, and ultimate failure of the actuator can result. Such failure can lead to emission non-compliance and can incur significant cost to a vehicle manufacturer if a recall is required.

Two known solutions to this problem are a sealed, impermeable actuator, or, alternatively, an actuator having working components which are unaffected by exhaust gas. Either of such actuators is currently impractical for cost and performance reasons. Further, a sealed actuator would be even more vulnerable to damage from trapped moisture if a leak should develop in the seal; and a corrosion-resistant actuator would require materials of construction which are less magnetically efficient than the currently used soft iron and powder metals, thus dictating a substantially larger solenoid.

What is needed is a device which may be fitted to an EGR valve and actuator that significantly reduces or eliminates gas and moisture intrusion into the actuator without impairing efficiency, size, and performance of the valve and actuator. Preferably, such a device is simple and inexpensive to fabricate and install.

SUMMARY OF THE INVENTION

The present invention is directed to a novel shield for a pintle valve, such as an exhaust gas recirculation valve for an internal combustion engine, for mitigating leakage or gas and moisture along valve pintle into the actuator to prevent corrosion and failure of the actuator. The shield is a tubular member having an equatorial radial flange and is slidably mounted on the pintle in an annular chamber between the valve body and the actuator. The inner diameter of the tube is selected to be as close-fitting to the pintle as possible while still being slidable thereupon to be adapted to either of two operating positions. During engine shutdowns, the shield is drawn by gravity toward the valve body to form a seal with the flange against the bearing splash shield, preventing or minimizing the escape of moist, hot gases under low pressure from the valve along the pintle. Such gases may be present at elevated temperatures after a running engine is shut down and are known to destructively permeate the actuator. During engine running, exhaust gases being managed within the valve may be under substantial pressure and therefore may be forced along the pintle through the bearing bore and bearing splash shield toward the actuator. In response, the shield may be forced by the gases slidably upwards on the pintle to form a seal with the flange against the actuator, allowing the leaked gases to escape radially from the pintle without invading the actuator.

BRIEF DESCRIPTION OF THE DRAWINGS

The foregoing and other objects, features, and advantages of the invention, as well as presently preferred embodiments thereof, will become more apparent from a reading of the following description in connection with the accompanying drawings, in which.

DESCRIPTION OF THE PREFERRED EMBODIMENT

Figure 1:
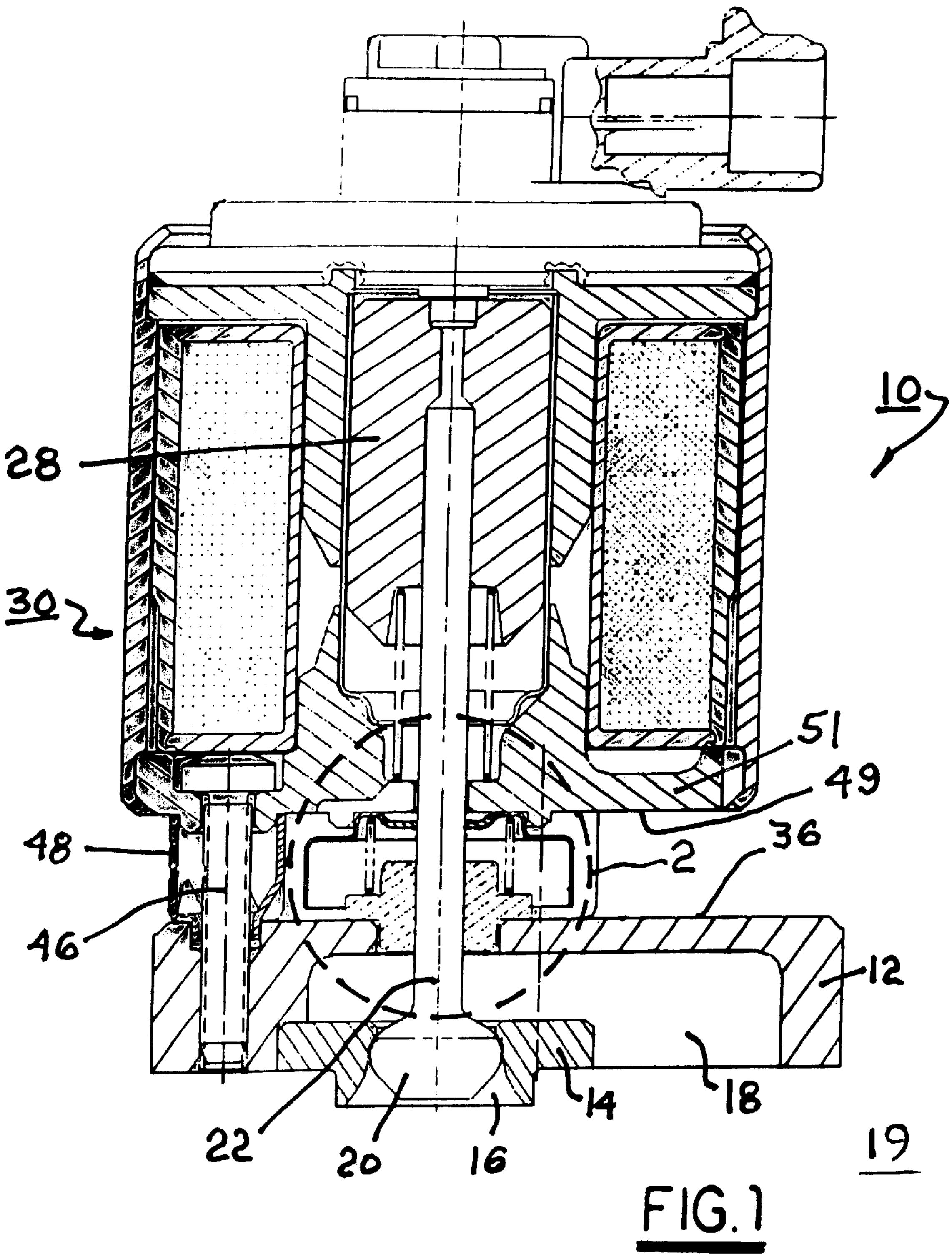
FIG.1 (PRIOR ART)
FIG. 1 is an elevational cross-sectional view of a prior art EGR valve.
Figure 2:
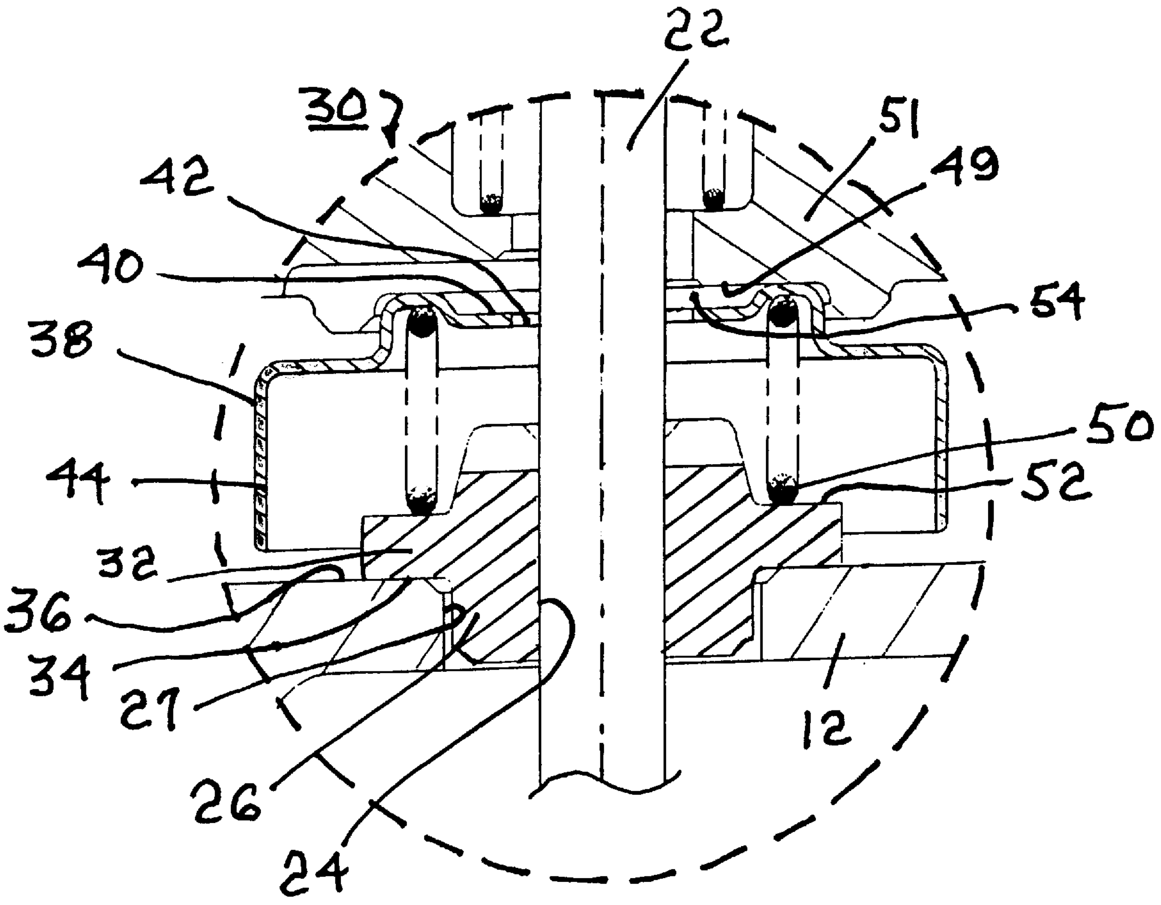
FIG. 2 (PRIOR ART)
FIG. 2 is an enlarged and detailed view of area 2 in FIG. 1.

The benefits afforded by the present invention will become more readily apparent by first considering a prior art pintle valve. Referring to FIGS. 1 and 2, a prior art EGR valve 10 includes a valve body 12 having a valve seat 14 separating a first chamber 16 from a second chamber 18, which chambers may communicate with the exhaust and intake systems, respectively, of an internal combustion engine 19 or the reverse. Valve head 20 is disposed adjacent to seat 14 for selectively mating therewith to open or to close communication between chambers 16 and 18. Valve stem, or pintle, 22 extends from head 20 through an axial bore 24 in bearing 26 and is captured within armature 28 of solenoid actuator 30. Bearing 26 is disposed in a port 27 in a wall of valve body 12 and guides stem 22 in reciprocating motion to open and close the valve when actuator 30 is energized and de-energized, respectively.

Bearing 26 is provided with a circumferential flange 32 having a first axial face 34 for sealing against axial outer surface 36 of valve body 12 to prevent leakage of gases therebetween. A cup-shaped bearing splash shield 38 has an inward-extending flange 40 with a central aperture 42 for passage of stem 22, preferably without contact therebetween, and a cylindrical skirt 44 extending axially to shield a substantial portion of bearing 26 from external contaminants. Shield 38 is open in a downwards direction to permit venting of any gases which may leak along bore 24 during operation of the valve. Actuator 30 is connected to valve body 12 via a plurality of bolts 46 extending through a plurality of standoffs 48. A coil spring 50 surrounding stem 22 is disposed within shield 38, being compressed between actuator 30 and a second surface 52 on flange 32 for urging flange 32 to seal against surface 36 under all operating conditions. Spring 50 also serves to urge shield 38 against surface 49 of primary polepiece 51 of actuator 30 to prevent dust intrusion into the actuator. Shield 38 is so configured that an annular chamber 54 exists inboard of the bearing locus of shield 38 against surface 49.

Figure 3:
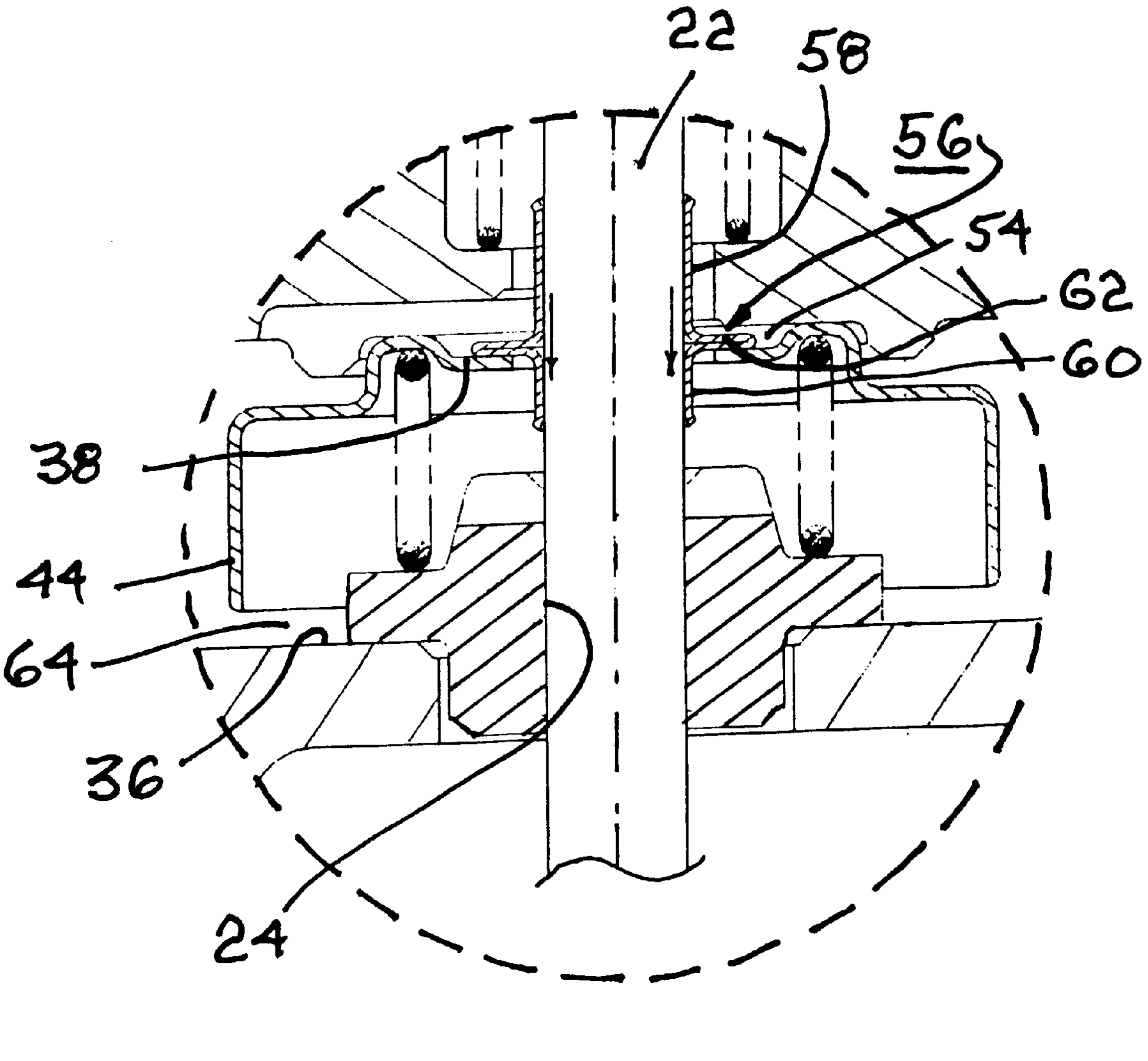
FIG. 3 is an elevational cross-sectional view of a valve like that shown in FIGS. 2 and 3 equipped with a moisture shield in accordance with the invention, shown in a first sealing position to which it is adaptable.
Figure 4:
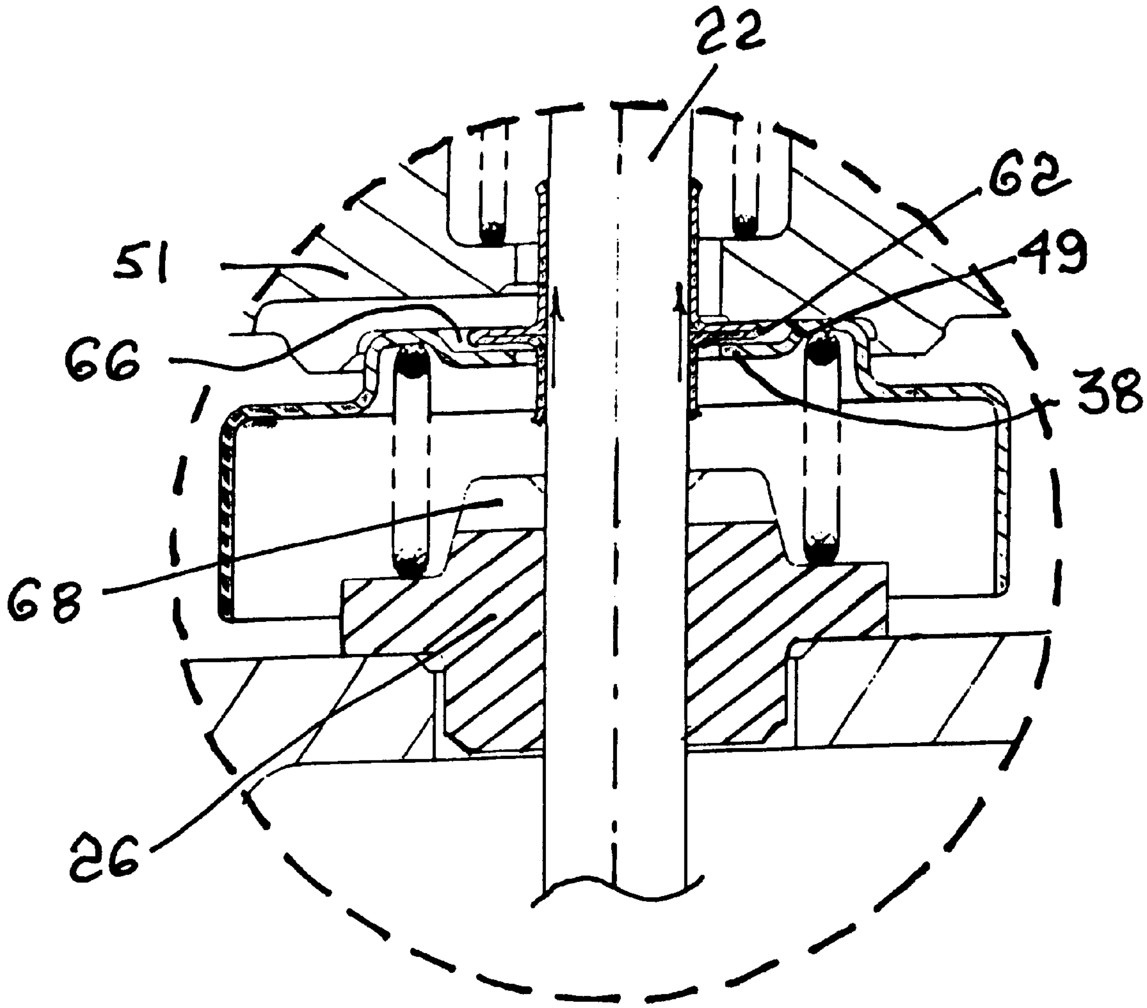
FIG. 4 is a view like that shown in FIG. 3, showing the moisture shield adapted to a second position.

Referring to FIGS. 3 and 4, a tubular moisture and gas shield 56 in accordance with the invention is provided within chamber 54 surrounding pintle 22 and extending axially in both directions along the surface of pintle 22 in first and second tubular portions 58,60, respectively. Shield 22 is preferably formed from metal tubing or drawn stock which is axially compressed in known fashion to cause a section of the tubing to collapse outwards and thereby form an equatorial radial flange 62 having an axial thickness less than the axial height of chamber 54. Alternatively, shield 56 may be formed as by injection molding of a high-temperature thermoplastic in known fashion. The inner diameter of shield 56 is selected to provide the tightest possible non-interference clearance to the pintle that still allows unrestricted axial motion of pintle 22 under all operating conditions. This relationship is very important to proper operation of the shield, as described below.

In operation, the following sequence occurs. During engine-off conditions, the gas and moisture shield 56 is urged by gravity into a first position as shown in FIG. 3, wherein flange 62 adapts to form a first seal against the upper surface of splash shield 38. This first seal prevents or at least greatly diminishes permeation of moisture-laden gases, which are known to flow out of valve body 12 along pintle 22 through bore 24, into actuator 30. Such leaking gases are effectively stopped and forced to flow radially out of the valve through gap 64 between skirt 44 and face 36.

During engine running conditions, leakage of moisture-laden exhaust gases may increase because of high pressures within the valve. The axial momentum of such gases is directed against flange 62, causing shield 56 to slide upwards along pintle 22, opening the first seal, until flange 62 engages surface 49, adapting to form a second seal therewith against the actuator, as shown in FIG. 4. Direct flow of gases along pintle 22 into actuator 30 is greatly impeded and is preferably channeled through radial vents 66 provided in polepiece 51. Preferably, similar radial vents 68 are provided in bearing 26 to assist in dissipating energy from the gases and directing them radially out through gap 64.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A shield for mitigating admission of moisture and gases into an actuator of a pintle-type valve, a pintle extending from a pintle bearing in a valve body through a bearing splash shield into an actuator, the moisture and gas shield comprising:

a) a tubular portion slidably disposed on said pintle, and b) a radial flange mounted on said tubular portion, said shield being slidably adaptable on said pintle to form alternately a first seal of said flange against said bearing splash shield and a second seal of said flange against said actuator.

2. A shield for mitigating admission of moisture and gases into an actuator of a pintle-type valve, the valve having a valve body and a pintle bearing disposed in the valve body and shielded by a bearing splash shield, the actuator being mounted on the valve body for receiving and axially actuating a pintle extending from the bearing through the splash shield into the actuator, an annular chamber being formed between the splash shield and the actuator, the moisture and gas shield comprising:

a) a tubular portion slidably disposed on said pintle, and b) a radial flange mounted equatorially on said tubular portion within said annular chamber, said shield being slidably adaptable on said pintle to form alternately a first seal of said flange against said bearing splash shield and a second seal of said flange against said actuator.

3. A pintle-type valve, comprising:

a) a valve body;

b) a pintle bearing disposed in said valve body and shielded by a bearing splash shield;

c) a pintle extending from said bearing through said splash shield;

d) an actuator mounted on said valve body for receiving and axially actuating said pintle, an annular chamber being formed between said splash shield and said actuator; and e) a moisture and gas shield having a tubular portion slidably disposed on said pintle and having a radial flange mounted equatorially on said tubular portion within said annular chamber, said moisture and gas shield being slidably adaptable on said pintle to form alternately a first seal of said flange against said bearing splash shield and a second seal of said flange against said actuator.

4. A valve in accordance with claim 3 wherein said valve is an exhaust gas recirculation valve.

5. A valve in accordance with claim 4 wherein said exhaust gas recirculation valve is mounted in an internal combustion engine.

* * * * *